US010515557B2

(12) United States Patent
Kubie et al.

(10) Patent No.: US 10,515,557 B2
(45) Date of Patent: Dec. 24, 2019

(54) MITIGATING NOISE EXPOSURE TO UNMANNED AERIAL VEHICLES

(71) Applicant: X Development LLC, Mountain View, CA (US)

(72) Inventors: Martin Kubie, San Francisco, CA (US); Adam Woodworth, San Jose, CA (US); Jesse Blake, Sunnyvale, CA (US); Reinaldo Negron, Palo Alto, CA (US); James Burgess, Redwood City, CA (US); André Prager, Sunnyvale, CA (US); Stephen Lacy, Mountain View, CA (US); Giulia Pantalone, San Francisco, CA (US)

(73) Assignee: Wing Aviation LLC, Mountain View, CA (US)

( * ) Notice: Subject to any disclaimer, the term of this patent is extended or adjusted under 35 U.S.C. 154(b) by 22 days.

(21) Appl. No.: 15/849,369

(22) Filed: Dec. 20, 2017

(65) Prior Publication Data
US 2019/0189016 A1 Jun. 20, 2019

(51) Int. Cl.
*G08G 5/00* (2006.01)
*G08G 5/06* (2006.01)
(Continued)

(52) U.S. Cl.
CPC ......... *G08G 5/0039* (2013.01); *G05D 1/0088* (2013.01); *G05D 1/0202* (2013.01);
(Continued)

(58) Field of Classification Search
CPC ............ B64C 2201/141; B64C 39/024; G01C 21/005; G05D 1/0005; G05D 1/0088;
(Continued)

(56) References Cited

U.S. PATENT DOCUMENTS 6,198,991 B1   3/2001   Yamakawa et al.
8,908,573 B1 * 12/2014   Wang .................. H04L 5/26
                                              370/280
(Continued)

FOREIGN PATENT DOCUMENTS

WO        2017/143588 A1    8/2017

OTHER PUBLICATIONS

Bulusu et al., "Extended Abstract: Noise Estimation for future large-scale small UAS Operations," Inter-Noise and Noise-Con Congress and Conference Proceedings, NoiseCon17, 8 pages.
(Continued)

*Primary Examiner* — Tyler J Lee
(74) *Attorney, Agent, or Firm* — Christensen O'Connor Johnson Kindness PLLC

(57) ABSTRACT

A computer implemented method of distributing noise exposures to unmanned aerial vehicles (UAVs) over a neighborhood includes: receiving flight routing requests to fly the UAVs over the neighborhood; accessing a noise exposure map stored in a noise exposure database in response to the flight routing requests; and generating new flight paths for the UAVs over the neighborhood that load level additional noise exposures that the new flight paths will contribute to the noise exposure map. The noise exposure map includes noise exposure values indexed to properties within the neighborhood. The noise exposure values quantify cumulative noise exposures of the properties due to historical flight paths of the UAVs over the neighborhood.

22 Claims, 6 Drawing Sheets

(51) Int. Cl.
*G05D 1/02* (2006.01)
*G05D 1/00* (2006.01)
*G05D 1/10* (2006.01)

(52) U.S. Cl.
CPC ........ *G08G 5/006* (2013.01); *B64C 2201/141* (2013.01); *G05D 1/101* (2013.01)

(58) Field of Classification Search
CPC ...... G05D 1/0202; G05D 1/101; G05D 1/104; G08G 5/0013; G08G 5/0026; G08G 5/0034; G08G 5/0039; G08G 5/006; G08G 5/0069; G08G 5/0082; G08G 5/0095

See application file for complete search history.

(56) References Cited

U.S. PATENT DOCUMENTS

| | | | | |
|---|---|---|---|---|
| 9,415,870 | B1* | 8/2016 | Beckman | B64C 39/024 |
| 9,422,055 | B1* | 8/2016 | Beckman | B64C 39/024 |
| 9,489,937 | B1 | 11/2016 | Beard et al. | |
| 9,646,597 | B1* | 5/2017 | Beckman | B64C 39/024 |
| 9,805,273 | B1* | 10/2017 | Seeber | G06T 7/223 |
| 10,370,093 | B1* | 8/2019 | Beckman | B64C 27/001 |
| 10,371,567 | B2* | 8/2019 | Lee | G01H 3/04 |
| 2005/0271221 | A1* | 12/2005 | Cerwin | H04R 1/406 381/92 |
| 2010/0017114 | A1* | 1/2010 | Tehan | G01C 21/00 701/423 |
| 2012/0296499 | A1 | 11/2012 | Kirchhofer et al. | |
| 2013/0317667 | A1 | 11/2013 | Kruglick | |
| 2015/0362920 | A1 | 12/2015 | McGregor et al. | |
| 2016/0025551 | A1* | 1/2016 | Lee | G01H 3/04 701/532 |
| 2016/0027307 | A1 | 1/2016 | Abhyanker et al. | |
| 2016/0063987 | A1* | 3/2016 | Xu | B64C 39/024 381/71.12 |
| 2016/0116914 | A1* | 4/2016 | Mucci | G05D 1/101 701/2 |
| 2017/0076610 | A1* | 3/2017 | Liu | B64C 39/024 |
| 2017/0169713 | A1 | 6/2017 | Gong et al. | |
| 2018/0189516 | A1* | 7/2018 | Browning | B64C 39/024 |
| 2018/0240346 | A1* | 8/2018 | Maeki | G08G 1/202 |
| 2019/0004172 | A1* | 1/2019 | Moskovchenko | G01S 15/10 |

OTHER PUBLICATIONS

International Search Report and Written Opinion from the International Searching Authority dated Mar. 29, 2019 for International Application No. PCT/US2018/065030, filed Dec. 11, 2018, 14 pages.

* cited by examiner

MITIGATING NOISE EXPOSURE TO UNMANNED AERIAL VEHICLES

TECHNICAL FIELD

This disclosure relates generally to unmanned aerial vehicles, and in particular but not exclusively, relates to noise mitigation of unmanned aerial vehicles.

BACKGROUND INFORMATION

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Unmanned aerial vehicles (UAVs) are becoming more popular in general. Their use over populated areas, such as suburban and urban localities, means that controlling and mitigating noise exposure to these vehicles is increasingly important.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1:
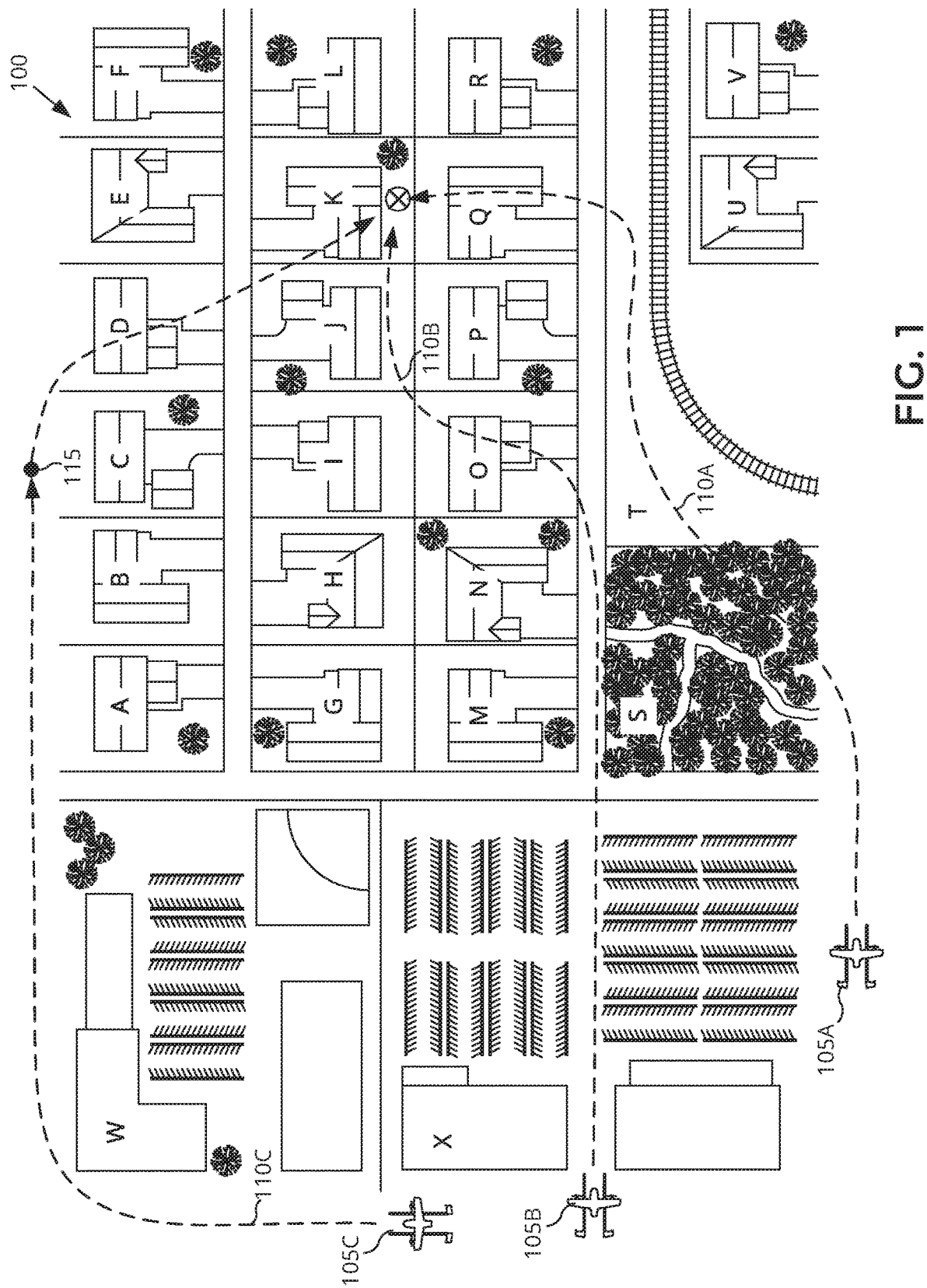
FIG. 1 is a terrestrial map of a neighborhood over which unmanned aerial vehicles (UAVs) may fly, in accordance with an embodiment of the disclosure.

Embodiments of a system, apparatus, and method for load leveling noise exposures to unmanned aerial vehicles (UAVs) across properties of a neighborhood are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

UAVs are becoming more popular and used for a greater variety of applications. For example, UAVs are often used for aerial photography or surveillance. UAVs are also being considered for automated delivery of small to medium sized packages. Their use over populated areas, such as suburban and urban neighborhoods, means that controlling and mitigating noise exposure to these aerial vehicles is increasingly important. Described herein is a system and technique that reduces or limits the noise impact on individual properties (or geospatial locations) in a neighborhood by load leveling noise exposures to UAVs across the neighborhood. Embodiments of the load leveling technique described herein attempt to distributed noise exposure events across the neighborhood to prevent or reduce concentrations of noise exposure events that overly impact a few properties. In some embodiments, the load leveling technique also seeks to distribute noise exposure events away from noise sensitive properties and towards noise insensitive properties.

The noise mitigation system described herein maintains a noise exposure database that tracks details of noise exposures on a per property basis due to historical flight paths of UAVs over a neighborhood. A flight routing subsystem operates as a mission planner, accessing noise exposure records stored in the noise exposure database to generate new flight paths over the neighborhood that load level additional noise exposures that the new flight paths will contribute to the properties in the neighborhood. When generating the new flight paths, the flight routing subsystem may consider a multitude of factors when load leveling, including: a noise exposure map, the location of a destination property in the neighborhood, the presence and location of noise insensitive or noise sensitive properties in the neighborhood, noise complaints, hours of operations of local businesses or schools, public transportation schedules, public events, anonymized data of life patterns, etc. The new flight paths may load level the additional noise exposures for new flight paths by varying the flight paths, introducing varied waypoints, varying flight altitudes, gliding over certain properties, directing active noise cancellation efforts in the direction of noise sensitive properties, and otherwise. In one embodiment, the flight routing system calculates a new flight path for every UAV flight over the neighborhood controlled by the noise mitigation system.

FIG. 1 is a terrestrial map of a neighborhood 100 over which UAVs 105A-105C fly, in accordance with an embodiment of the disclosure. The illustrated neighborhood 100 includes properties A-X including: residences A-R, U and V, unpopulated forest property S, transportation corridor T (e.g., railroad tracks), school property W, and commercial property X. Residential property K is illustrated as a destination property for three separate flight paths 110A, 110B, and 110C of three different UAVs 105A, 105B, and 105C, respectively. UAV 105C flies along a flight path 110C that includes a waypoint 115 prior to flying to destination property K. The term "property" is broadly defined herein to include not just a whole real property parcel, but also fractions of a real property parcel, premises (e.g., buildings, individual apartments in an apartment complex, etc.) or other generic physical locations (e.g., geospatial locations, coordinate locations, etc.).

Neighborhood 100 may include a number of properties deemed noise insensitive. A noise insensitive property is a property that the noise mitigation system has tagged as being relatively tolerant to UAV noise. For example, these are properties that are already noisy or subject to alternative sources of noise, or properties that are relatively unpopulated therefore UAV noise is not likely to significantly bother inhabitants. For example, noise insensitive properties may include loud transportation corridors (e.g., property T), commercial corridors (e.g., property X), unpopulated properties (e.g., property S), or otherwise. Although FIG. 1 illustrates property T as including railroad tracks, property T could be a busy highway, a freeway, a main bus line, or otherwise. In one embodiment, properties that are adjacent to loud noise producing properties, such as loud transportation or commercial/industrial corridors, may also be deemed noise insensitive properties. In FIG. 1, residences M, O, P, Q, R, U, and V may be deemed noise insensitive properties due to their proximity to either commercial property X or transportation corridor T. Some properties may be deemed a part-time noise insensitive based upon business or school hours. For example, in some embodiments, commercial property X may only be deemed noise insensitive during non-business hours and school W may only be deem noise insensitive when school is not in session.

Neighborhood 100 may also include a number of noise sensitive properties. A noise sensitive property is a property that the noise mitigation system has tagged as being relatively intolerant to UAV noise. For example, noise sensitive properties may include schools in session, residences in quiet areas of neighborhood 100, residences for which a UAV noise complaint has been registered, businesses during business hours, or otherwise.

Figure 2:
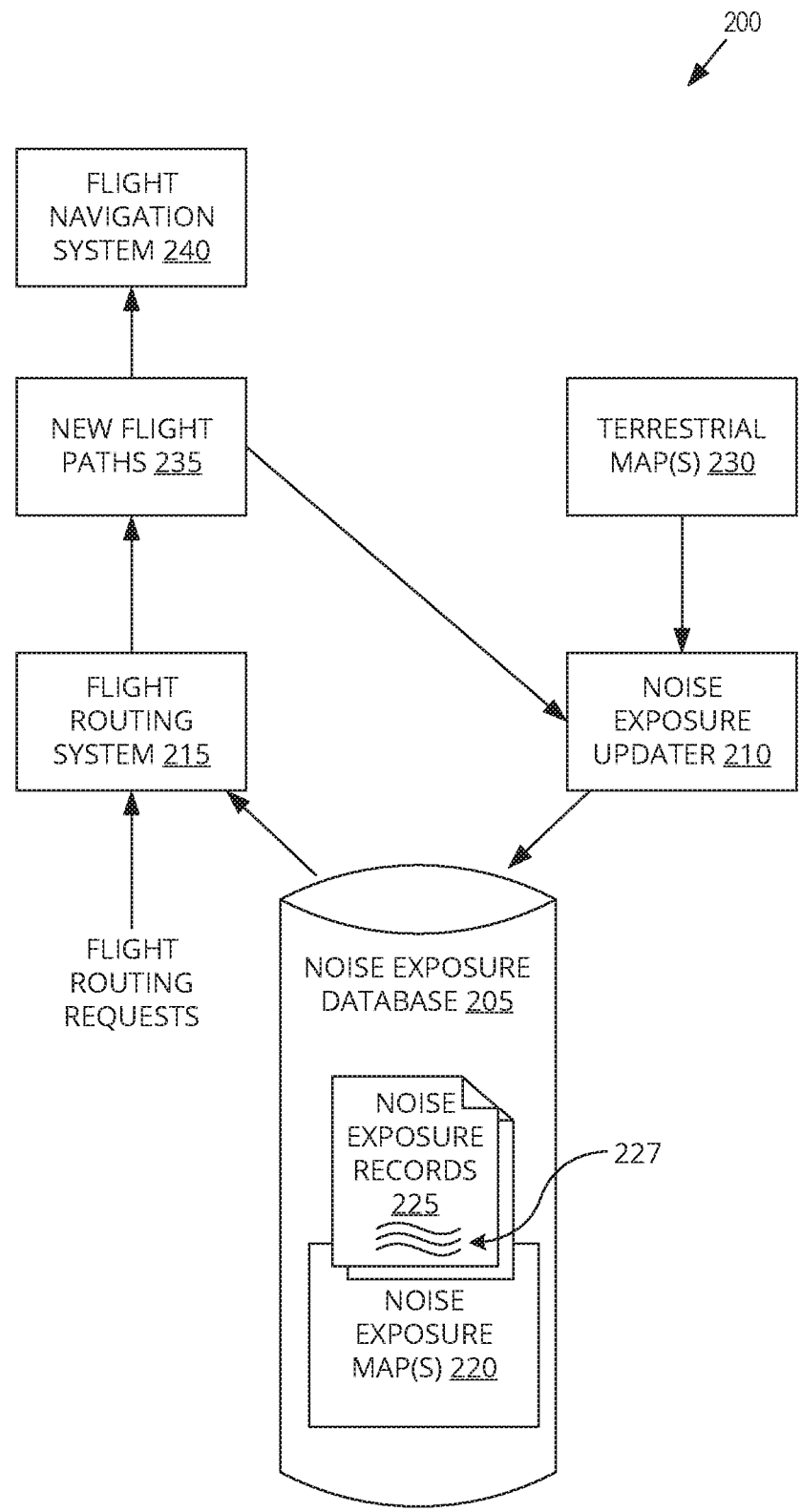
FIG. 2 is a functional block diagram of a UAV noise mitigating system, in accordance with an embodiment of the disclosure.

FIG. 2 is a functional block diagram of a UAV noise mitigation system 200 for load leveling UAV noise exposures across a neighborhood, such as neighborhood 100, in accordance with an embodiment of the disclosure. The illustrated embodiment of UAV noise mitigation system 200 includes a noise exposure database 205, a noise exposure updater 210, and a flight routing system 215. The illustrated embodiment of noise exposure database 205 stores a noise exposure map 220 and noise exposure records 225 including noise exposure values 227.

Noise exposure updater 210 is coupled to access one or more terrestrial maps 230 of neighborhood 100 and generate one or more noise exposure maps 220 along with records 225 for storing in noise exposure database 205. Records 225 include noise exposure values 227 indexed to properties within neighborhood 100 identified within noise exposure maps 220. Although the embodiments illustrated herein describe indexing noise exposure values to "properties," it should be appreciated that the techniques described also include indexing noise exposure values to generic locations (e.g., geospatial locations). Noise exposure updater 210 generates, calculates, updates, and otherwise maintains noise exposure values 227 within records 225. During operation, noise exposure updater 210 is coupled to receive new flight paths 235 of UAVs 105 that have flown over neighborhood 100 and uses details of these new flight paths 235 to update and maintain noise exposure values 227. In one embodiment, updates of the noise exposure values 227 are updated in real-time for each UAV flight, shortly after completion of a given UAV flight over neighborhood 100, or periodically on a regular schedule (e.g., nightly, weekly, etc.). In one embodiment, noise exposure updater 210 is implemented with one or more software modules stored in a memory and executable by one or more processors. Noise exposure updater 210 may be executed on a centralized computing system or a distributed computing system. Similarly, noise exposure database 205 may be a centralized data store or a distributed data store.

Flight routing system 215 is coupled to noise exposure database 205 to access noise exposure map(s) 220 and records 225 to generate new flight paths 235 in response to flight routing requests. In one embodiment, a new flight path 235 is calculated for each request to fly a UAV 105 over neighborhood 100. New flight paths 235 are generated in a manner, based upon noise exposure map(s) 220 and the noise exposure values 227 of the properties within neighborhood 100, to load level additional noise exposures that new flight paths 235 will contribute to noise exposure map(s) 220 (and ultimately contribute to properties A-X of neighborhood 100). New flight paths 235 are provided to a flight navigation system 240 for guiding UAVs 105. Flight navigation system 240 may include an on-board navigation system of the UAVs 105 and/or a centralized dispatcher that wirelessly navigates UAVs 105. In one embodiment, flight routing system 215 is implemented with one or more software modules stored in a memory and executable by one or more processors. Flight routing system 215 may be executed on a centralized computing system or a distributed computing system.

Figure 3:
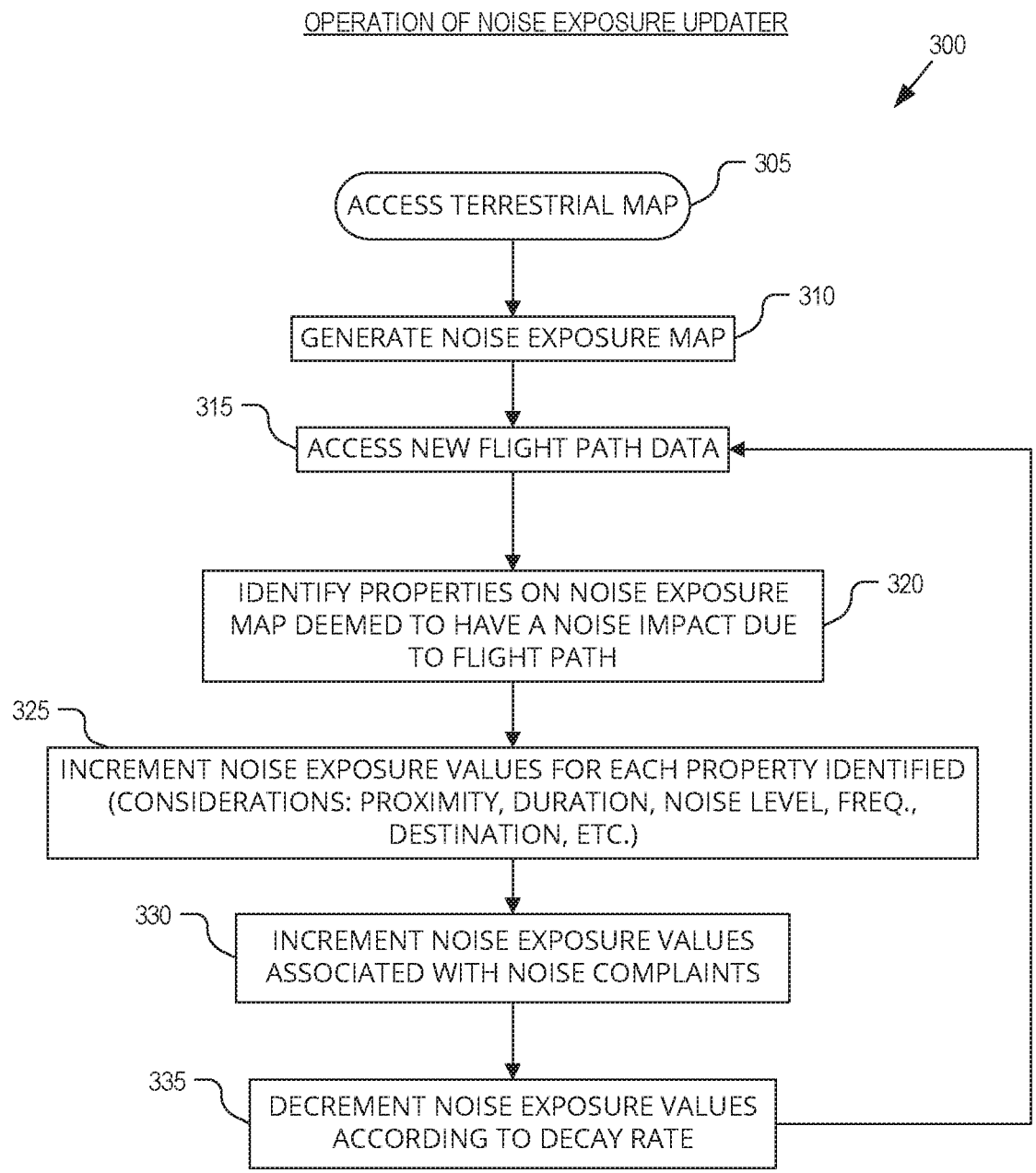
FIG. 3 is a flow chart illustrating a process for updating noise exposure values of a noise exposure map, in accordance with an embodiment of the disclosure.

FIG. 3 is a flow chart illustrating a process 300 for maintaining noise exposure values 227 of noise exposure map 220, in accordance with an embodiment of the disclosure. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

In a process block 305, noise exposure updater 210 accesses terrestrial map 230 of neighborhood 100. Terrestrial map 230 may be a proprietary or publically available map and/or map data, such as geographic information system (GIS) map data, that includes property delineations, property types (e.g., zoning classifications, etc.), coordinate/location data, and other available data describing the properties of neighborhood 100. Noise exposure updater 210 uses the terrestrial map 230 to generate a noise exposure map 220, which it stores into noise exposure database 205 (process block 310).

Figure 4:
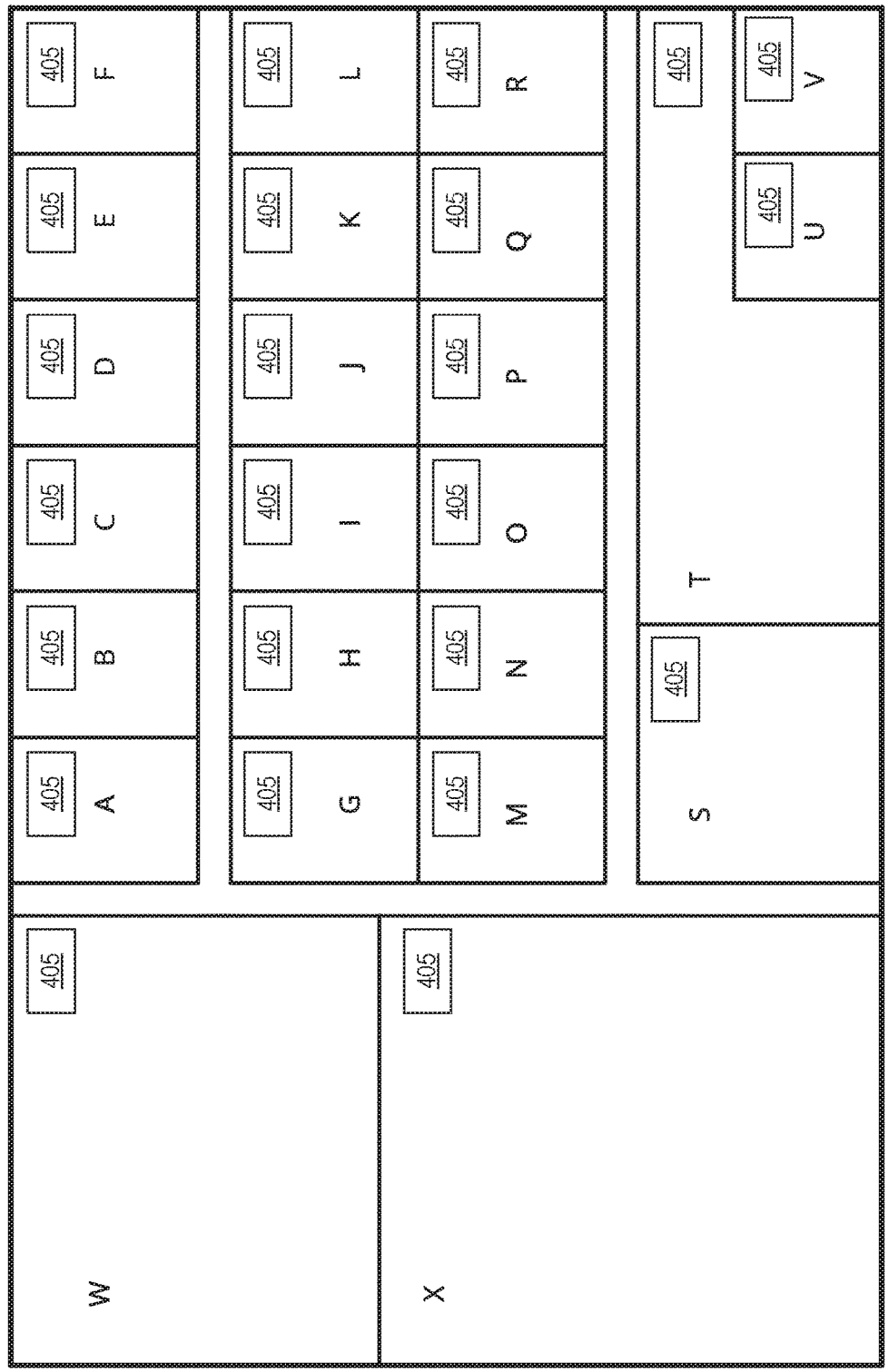
FIG. 4 is an illustration of a noise exposure map, in accordance with an embodiment of the disclosure.

FIG. 4 illustrates an example noise exposure map 400, which is one possible implementation of noise exposure map 220. Noise exposure map 400 includes properties A-X indexed to noise exposure values 405. Noise exposure values 405 may include one or more values that represent an amount of noise to which a given property has been exposed overtime (e.g., cumulative noise exposure) by UAV flights. In one embodiment, noise exposure values 405 include heat map values indicative of cumulative noise exposures for each property. In one embodiment, noise exposure values 405 may also include other noise related data, such as a registry for noise complaints, indications of whether a property is deemed noise sensitive or noise insensitive, noise related threshold values, hours/dates of when a given property is deemed noise insensitive vs noise sensitive, etc. In one embodiment, at least one of the noise exposure values 405 for each property is a value that quantifies cumulative noise exposures for that property.

Returning to FIG. 3, once noise exposure updater 210 receives a notification, or otherwise determines, that a new flight path has or will be traversed by a UAV 105 across neighborhood 100, noise exposure updater 210 accesses the new flight path data (process block 315). The new flight path data may be used by noise exposure updater 210 to identify properties on noise exposure map 220 deemed to have a noise impact due to the new flight path (process block 320). In one embodiment, a threshold distance calculation between a given property and the new flight path is used to determine whether a given property has a noise impact. Other noise related threshold factors such as UAV noise level, altitude, flight speed, duration of UAV noise interaction with a given property, whether a given property is noise sensitive or insensitive, etc. may be used to determine whether a new flight path is deemed to have a noise impact on a given property.

In a process block 325, for properties determined to have a noise impact from a new UAV flight path, noise exposure values 227 are adjusted or incremented to account for the calculated noise impact. The amount of adjustment or increment of a property's noise exposure value 227, may account for one or more of a proximity of a given property to the new flight path, a duration of an additional noise exposure for the property due to the new flight path, a noise level of the additional noise exposure for the property due to the new flight path, or a frequency of cumulative noise exposures for the property. Other noise related factors may also be considered when adjusting noise exposure values 227. For example, in one embodiment, properties that have been designated a destination property for a UAV flight path may be deemed more noise tolerant towards UAVs and thus receive smaller increments. In one embodiment, the noise exposure value of the destination property of a given UAV fight path is not incremented due to the specific UAV flight path even though the noise exposure values of other properties having a noise impact due to the specific UAV flight path are incremented. The exception for the destination properties acknowledges that the destination property, which may be receiving a package delivery via a UAV 105, receives a tangible benefit due to the specific UAV flight and is thus less likely to consider the UAV noise as an annoyance.

In a process 330, noise complaints associated with a given property may be used to adjust noise exposure values 227. For example, upon registering a noise complaint due to a UAV 105 flyby, noise exposure updater 210 may increment the noise exposure value associated with that property. In one embodiment, increments due to noise complaints are exponential to substantially reduce the frequency of additional noise exposures for that property.

Finally, in a process block 335, noise exposure values 227 of noise exposure map 220 are decremented according to a specified decay rate. The decay rate may be fixed or variable for a given neighborhood. For example, the decay rate may change based upon the season. Furthermore, decay rates may vary between neighborhoods to bias or load balance UAV flights between neighbhorhoods. The decay rate may be specified by the UAV operator.

Figure 5:
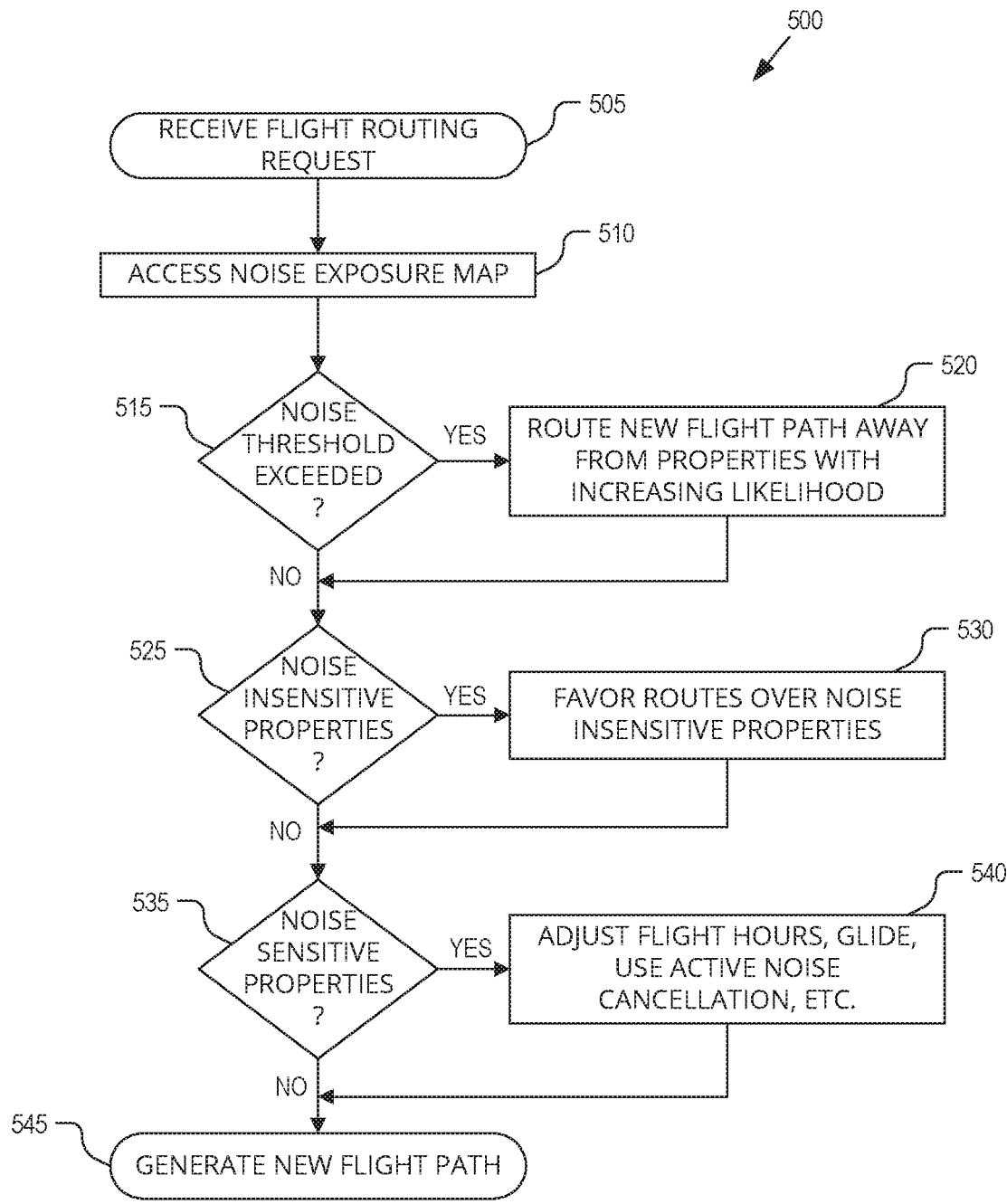
FIG. 5 is a flow chart illustrating a process for generating new flight routes that load level additional noise exposures from flight paths of UAVs, in accordance with an embodiment of the disclosure.

FIG. 5 is a flow chart illustrating a process 500 for generating new flight routes that load level additional noise exposures from flight paths of UAVs 105, in accordance with an embodiment of the disclosure. Process 500 describes the operation of flight routing system 215 in at least one embodiment. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

Upon receipt of a flight routing request (process block 505), flight routing system 215 accesses noise exposure map 220 in noise exposure database 205 (process block 510). Flight routing system 215 references noise exposure map 220 to generate a new flight path 235 over neighborhood 100 that load balances the additional noise exposures that the new flight path 235 will contribute to noise exposure map 220. Flight routing system 215 may consider a number of factors when making flight routing decisions. These factors are tracked on a per property basis using noise exposure records 225 and noise exposure values 227.

In general, flight routing system 215 strives to distribute or load balance noise exposures across neighborhood 100 to reduce the likelihood that any one noise sensitive property will receive a disproportionate share of nuisance noise from UAVs 105. In one embodiment, load leveling may be accomplished by attempting to evenly distribute or scatter flight paths 110 across neighborhood 100 using variable waypoints 115 or variable, and sometimes non-direct, paths. However, load leveling between properties within neighborhood 100 can still account for the differing noise sensitivities of the properties and does not mean that noise exposure events will not be intentionally concentrated towards properties deemed noise insensitive. Rather, the load leveling described herein attempts to bias noise exposure events towards properties deemed noise insensitive while also distributing or spreading out noise exposure events across the properties deemed noise sensitive. As described above, the status of a property as either noise sensitive or noise insensitive may be a dynamic status that changes based upon time of day or even season.

In a decision block 515, flight routing system 215 considers whether a new flight path 235 will cause one or more properties to exceed an associated noise threshold. If a noise threshold of one or more properties will be exceeded by a potential new flight path 235, then flight routing system 215 will attempt to reroute new flight paths away from such properties (process block 520). Noise thresholds may be associated with a cumulative noise exposure value (e.g., heat map value), a frequency of noise exposure incidents (e.g., frequency of the cumulative noise exposures for a given property), whether or not a threshold number of noise complaints have been registered for a given property, or otherwise. In one embodiment, multiple thresholds may be associated with a given noise exposure value. As each threshold is exceeded, or based upon the amount a single threshold has been exceeded, the likelihood that a route will be directed away from a given property may also increase. In some embodiments, rerouting away from a given property having one or more noise related thresholds exceeded may increase with exponential likelihood.

In a decision block 525, flight routing system 215 determines whether properties deemed noise insensitive (e.g., properties S, T, O, P, Q, R, U, V, X and sometimes W or X), are in neighborhood 100 and reside along a potential flight path. If so, routes that pass over or along the noise insensitive properties while still being capable of achieving the goals of the UAV mission (e.g., reaching a destination property, etc.) are favored (process block 530).

In a decision block 535, flight routing system 215 determines whether properties deemed noise sensitive (e.g., properties A-L, N, and sometimes W or X), are in neighborhood 100 and reside along the potential flight path. If so, process 500 continues to a process block 540 where a number of noise mitigation and load leveling strategies may be employed to route the new flight path over or along these noise insensitive properties. For example, flight hours may be adjusted to take advantage of part-time noise sensitive properties and fly during hours when such properties are deemed noise insensitive. In the illustrated embodiment, property W may be deemed noise insensitive during non-school hours and property X may be deemed noise insensitive during non-business hours. Other time shifting techniques may include considering when public events occur (e.g., outdoor events) and avoid flybys during these events, or accessing public transportation schedules and scheduling the timing of flybys during noisy times (e.g., during rush hour bus schedules, while trains are in the area, etc.).

Another technique that may be employed is to strategically glide, or partially glide, UAVs 105 when flying near noise sensitive properties, particularly properties that have not registered UAV noise complaints. In one embodiment, flight routing system 215 schedules the UAV to temporarily disable or reduce rotor thrust to reduce or eliminate rotor noise at strategic locations. The new flight path may also include planned rises in altitude at a strategic location prior to disabling or reducing rotor thrust so that a scheduled glide path, or partial glide path with reduced rotor thrust, can temporarily tradeoff altitude for reduced UAV noise when travelling proximate to a selected noise sensitive property.

Figure 6:
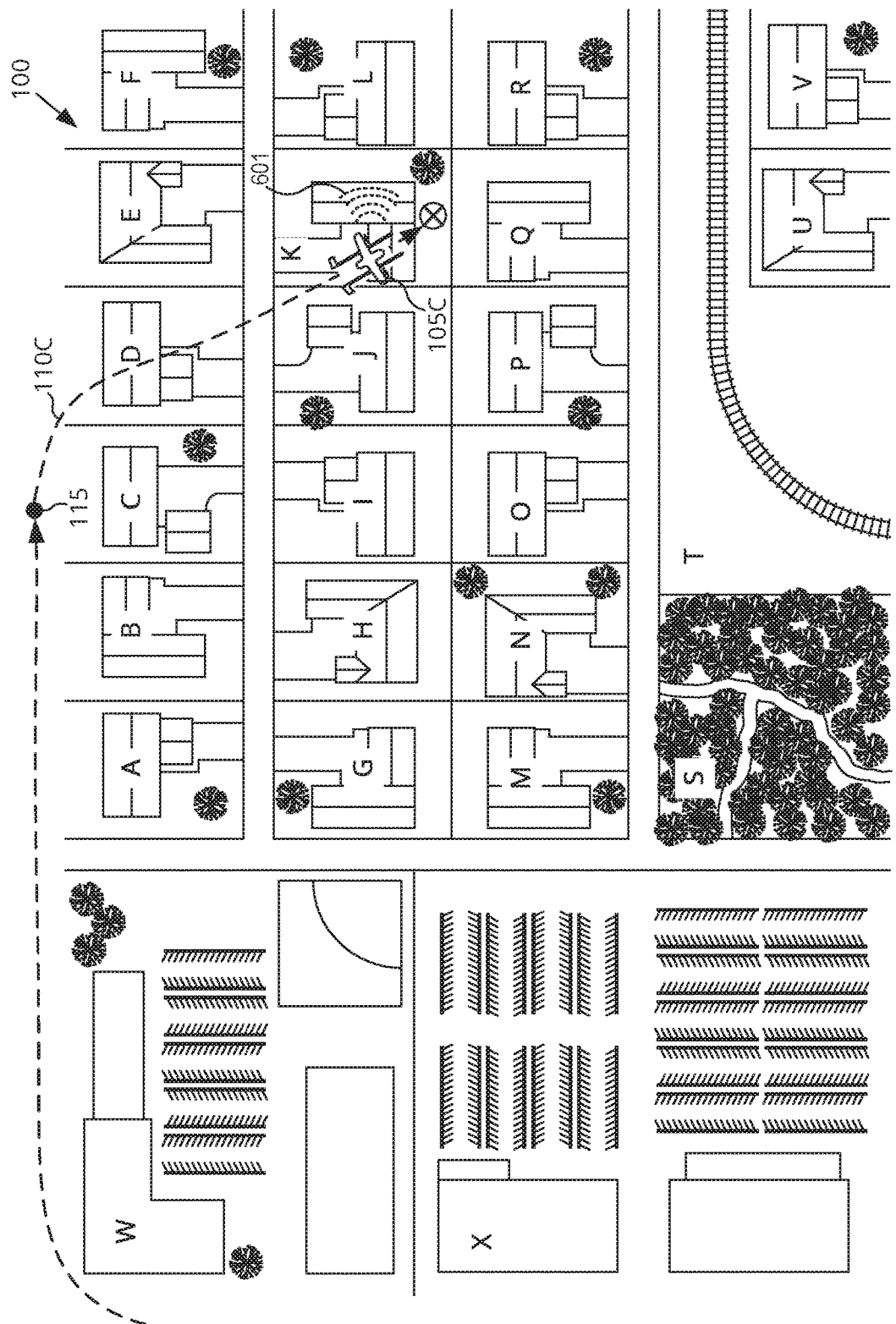
FIG. 6 illustrates onboard speaker driven noise mitigation techniques, in accordance with an embodiment of the disclosure.

Yet another technique that may be employed in process block 540 is to use onboard speaker driven noise mitigation techniques. One such noise mitigation technique is to use active noise cancellation directed at a specified noise sensitive property (e.g., a property for which a UAV noise complaint has been registered) to reduce the additional noise exposure experienced by the particular noise sensitive property when flying in its vicinity. FIG. 6 illustrates an example scenario where property K is a destination property (e.g., receiving a package delivery via UAV 105C) and property L has been deemed a noise insensitive property (e.g., registered a past UAV noise complaint). When UAV 105C approaches its destination along flight path 110C, speakers on-board UAV 105C may be scheduled to output active noise cancellation 601 towards property L to cancel or reduce the noise impact caused by the rotors of UAV 105C when delivering a package to property K. The directionality of the active noise cancellation 601 may be computed by flight routing system 215 with reference to noise exposure map 220. The instructions of when and which direction to direct active noise cancellation 601 may be programmed by flight routing system 215 and included with a new flight path 235.

Additionally, or alternatively, the speakers of UAV 105C may be programmed to emit select frequencies to mitigate the perceived annoyance of the multi-rotor tonal noise generated by UAV 105C. The noise spectrum of multi-rotor tonal noise primarily includes a few strong tones and their harmonics with some much lower intensity broadband noise. The onboard speakers of UAV 105C may be programmed, and scheduled by flight routing system 215 with reference to noise exposure map 220, to add pseudorandom noise to fill in the frequencies between the tonal noise produced by the multi-rotors of UAV 105C. This filler noise, when combined with the multi-rotor tonal noise, will be perceived more like white noise or pink noise, which is often perceived as a lesser annoyance than the multi-rotor tonal noise alone.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer implemented method of distributing noise exposures to unmanned aerial vehicles (UAVs) over a neighborhood, the method comprising:
   receiving a flight routing request to fly a first UAV of the UAVs over the neighborhood;
   accessing a noise exposure map stored in a noise exposure database in response to the flight routing request, wherein the noise exposure map includes noise exposure values indexed to locations within the neighborhood, and wherein each of the noise exposure values quantifies a cumulative noise exposure of a corresponding one of the locations due at least in part to historical flight paths of the UAVs over the neighborhood; and
   generating a new flight path for the first UAV over the neighborhood that load levels additional noise exposures that the new flight path will contribute to the noise exposure map.

2. The method of claim 1, further comprising:
   causing the first UAV to fly over the neighborhood along the new flight path by uploading the new flight path into a memory of the first UAV or by wirelessly guiding the first UAV to fly along the new flight path.

3. The method of claim 1, further comprising:
updating the noise exposure values stored within the noise exposure database to account for the additional noise exposures that the new flight path causes when the first UAV flies the new flight path over the neighborhood.

4. The method of claim 3, wherein updating the noise exposure values includes adjusting a first noise exposure value associated with a first location of the locations when the new flight path is determined to have a noise impact on the first location by exceeding one or more noise related thresholds associated with the first location.

5. The method of claim 3, wherein updating the noise exposure values includes adjusting a given one of the noise exposure values to account for one or more of:
a proximity of a given one of the locations to the new flight path,
a duration of a given one of the additional noise exposures for the given one of the locations,
a noise level of the given one of the additional noise exposures, or
a frequency of noise exposures to the given one of the locations.

6. The method of claim 3, wherein the flight routing request is a request to fly the first UAV to a destination location within the neighborhood, and wherein updating the noise exposure values of the noise exposure map comprises:
incrementing the noise exposure values for other ones of the locations impacted by flying the first UAV to the destination location, but not incrementing one of the noise exposure values associated with the destination location.

7. The method of claim 1, further comprising:
decrementing the noise exposure values of the locations according to a specified decay rate.

8. The method of claim 1, further comprising:
incrementing a selected one of the noise exposure values associated with a selected one of the locations upon registering a noise complaint associated with the selected one of the locations.

9. The method of claim 1, wherein generating the new flight path that load levels the additional noise exposures includes:
routing the new flight path away from selected ones of the locations with increasing likelihood when the noise exposure values associated with the selected ones of the locations exceed a threshold noise value.

10. The method of claim 1, wherein generating the new flight path that load levels the additional noise exposures includes favoring a route for the new flight path that passes over or along a selected one of the locations that is deemed a noise insensitive property.

11. The method of claim 10, wherein the noise insensitive property includes one of an unpopulated property or an adjacent property that is proximate to a loud transportation or commercial corridor.

12. The method of claim 10, wherein the noise insensitive property includes a business during non-business hours.

13. The method of claim 1, wherein generating the new flight path that load levels the additional noise exposures includes:
scheduling the first UAV to temporarily disable or reduce rotor thrust to reduce or eliminate rotor noise; and
scheduling the first UAV to glide, or partially glide, over a noise sensitive property of the locations while the rotor thrust is temporarily disabled or reduced.

14. The method of claim 1, wherein generating the new flight path that load levels the additional noise exposures includes:
selecting the new flight path based at least in part on one or more of hours of operation of local businesses, occurrence of public events, school hours, or public transportation schedules.

15. The method of claim 1, wherein generating the new flight path that load levels the additional noise exposures includes:
scheduling speakers of the first UAV to direct active noise cancellation in a direction of a noise sensitive property when flying proximate to the noise sensitive property to reduce a given additional noise exposure to the noise sensitive property.

16. A system for distributing noise exposures to unmanned aerial vehicles (UAVs) over a neighborhood, the system comprising:
a noise exposure database storing a noise exposure map for the neighborhood, wherein the noise exposure map includes noise exposure values indexed to properties within the neighborhood, and wherein the noise exposure values quantify cumulative noise exposures of the properties due at least in part to historical flight paths of the UAVs over the neighborhood;
a flight routing system coupled to the noise exposure database, wherein the flight routing system includes instructions stored on a memory, that when executed by the flight routing system, cause the flight routing system to perform operations including:
receiving a flight routing request to fly a first UAV of the UAVs over the neighborhood; and
generating a new flight path for the first UAV, in response to the flight routing request, that load levels additional noise exposures that the new flight path will contribute to the noise exposure map; and
a noise exposure updater coupled to the noise exposure database to update the noise exposure values in response to the first UAV flying the new flight path over the neighborhood.

17. The system of claim 16, wherein the noise exposure updater includes instructions, that when executed, cause the noise exposure updater to perform operations including:
adjusting a first noise exposure value associated with a first property of the properties when the new flight path is determined to have a noise impact on the first property by exceeding one or more noise related thresholds associated with the first property.

18. The system of claim 16, wherein the noise exposure updater includes further instructions, that when executed, cause the noise exposure updater to perform further operations including:
adjusting a given one of the noise exposure values to account for one or more of:
a proximity of a given one of the properties to the new flight path,
a duration of a given one of the additional noise exposures for the given one of the properties,
a noise level of the given one of the additional noise exposures, or
a frequency of noise exposures to the given one of the properties.

19. The system of claim 16, wherein the noise exposure updater includes further instructions, that when executed, cause the noise exposure updater to perform further operations including:
   incrementing a selected one of the noise exposure values associated with a selected one of the properties upon registering a noise complaint associated with the selected one of the properties.

20. The system of claim 16, wherein generating the new flight paths that load level the additional noise exposures includes:
   routing the new flight path away from selected ones of the properties with increasing likelihood when the noise exposure values associated with the selected ones of the properties exceed a threshold noise value.

21. The system of claim 16, wherein generating the new flight path that load levels the additional noise exposures includes favoring a route for the new flight path that passes over or along a selected one of the properties that is deemed a noise insensitive property.

22. At least one machine-accessible storage medium that provides instructions that, when executed by a machine, will cause the machine to perform operations comprising:
   receiving a flight routing request to fly a first unmanned aerial vehicle (UAV) of a plurality of UAVs over a neighborhood;
   accessing a noise exposure map stored in a noise exposure database in response to the flight routing request, wherein the noise exposure map includes noise exposure values indexed to locations within the neighborhood, and wherein each of the noise exposure values quantifies a cumulative noise exposure of a corresponding one of the locations due at least in part to historical flight paths of the UAVs over the neighborhood; and
   generating a new flight path for the first UAV over the neighborhood that load levels additional noise exposures that the new flight path will contribute to the noise exposure map.

* * * * *